(12) United States Patent
Uchino et al.

(10) Patent No.: US 10,938,461 B2
(45) Date of Patent: Mar. 2, 2021

(54) WIRELESS CONTROL APPARATUS

(71) Applicant: MITSUBISHI ELECTRIC CORPORATION, Tokyo (JP)

(72) Inventors: Daichi Uchino, Tokyo (JP); Noriyuki Fukui, Tokyo (JP); Masaaki Kusano, Tokyo (JP); Kazuaki Ishioka, Tokyo (JP); Keijiro Take, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 94 days.

(21) Appl. No.: 16/326,655

(22) PCT Filed: Oct. 28, 2016

(86) PCT No.: PCT/JP2016/082057
§ 371 (c)(1),
(2) Date: Feb. 19, 2019

(87) PCT Pub. No.: WO2018/078794
PCT Pub. Date: May 3, 2018

(65) Prior Publication Data
US 2020/0382186 A1    Dec. 3, 2020

(51) Int. Cl.
*H04B 7/06*     (2006.01)
*H04B 7/0408*   (2017.01)
(Continued)

(52) U.S. Cl.
CPC ......... *H04B 7/0617* (2013.01); *H04B 7/0408* (2013.01); *H04W 16/28* (2013.01); *H04W 24/10* (2013.01); *H04W 72/046* (2013.01)

(58) Field of Classification Search
CPC .... H04B 7/0408; H04B 7/0413; H04B 7/043; H04B 7/0617; H04W 16/28; H04W 24/10; H04W 72/046
(Continued)

(56) References Cited

U.S. PATENT DOCUMENTS

2009/0318088 A1* 12/2009 Wu ............... H04B 7/0697
455/63.4
2010/0150013 A1*  6/2010 Hara .............. H04B 17/12
370/252
(Continued)

FOREIGN PATENT DOCUMENTS

EP      1 069 713 A1    1/2001
JP    2012-514377 A    6/2012
(Continued)

OTHER PUBLICATIONS

Office Action issued in corresponding German Application No. 11 2016 007 260.0 dated Jan. 13, 2020.
(Continued)

*Primary Examiner* — Young T. Tse
(74) *Attorney, Agent, or Firm* — Birch, Stewart, Kolasch & Birch, LLP

(57) ABSTRACT

A wireless control apparatus controls beamforming performed by a wireless base station apparatus that provides a communication service to a service area which includes a plurality of spots to be irradiated with a beam including a terminal search beam and a communication beam that are not used simultaneously for irradiation, and is irradiated with a plurality of the beams and is not simultaneously covered by the plurality of beams, and the apparatus includes: an arrival direction estimation unit that estimates an arrival direction of a wireless signal transmitted by a terminal communicating with a wireless base station; and a control unit that determines whether there is an active terminal in the spots on the basis of the arrival direction estimated by the arrival direction estimation unit, and, when it is determined that there is no active terminal, controls beamforming performed by the wireless base station apparatus to decrease a frequency of the terminal search beam with which one or more of the spots determined to include (Continued)

no active terminal is irradiated and increases a frequency of a communication beam with which another of the spots in the service area is irradiated.

6 Claims, 7 Drawing Sheets

(51) Int. Cl.
  *H04W 16/28* (2009.01)
  *H04W 24/10* (2009.01)
  *H04W 72/04* (2009.01)
(58) Field of Classification Search
  USPC ............. 375/259, 260, 267; 370/331–334; 455/456.1, 456.3, 456.5, 456.6
  See application file for complete search history.

(56) References Cited

U.S. PATENT DOCUMENTS

| | | | |
|---|---|---|---|
| 2011/0182376 A1* | 7/2011 | Abe | ............ H04L 5/0048 375/260 |
| 2012/0129528 A1* | 5/2012 | Kobayashi | ........ H04W 36/0016 455/436 |
| 2012/0220315 A1* | 8/2012 | Karttaavi | ............ G01S 13/74 455/457 |
| 2013/0286960 A1* | 10/2013 | Li | ............ H04B 7/0684 370/329 |
| 2014/0070995 A1 | 3/2014 | Itagaki | |
| 2016/0065284 A1* | 3/2016 | Yu | ............ H04B 7/088 370/329 |
| 2016/0095102 A1 | 3/2016 | Yu et al. | |
| 2016/0345216 A1 | 11/2016 | Kishiyama et al. | |
| 2017/0222693 A1 | 8/2017 | Shen et al. | |
| 2018/0376352 A1* | 12/2018 | Uchino | ............ H04W 24/02 |

FOREIGN PATENT DOCUMENTS

| | | |
|---|---|---|
| JP | 2014-53780 A | 3/2014 |
| JP | 2016-167776 A | 9/2016 |
| WO | WO 2010/077192 A1 | 7/2010 |
| WO | WO 2015/115376 A1 | 8/2015 |
| WO | WO 2016/013608 A1 | 1/2016 |

OTHER PUBLICATIONS

International Search Report for PCT/JP2016/082057 (PCT/ISA/210) dated Jan. 10, 2017.

Uchino et al., "Study on Directional Beam Arrangement in Mobile Communication System", Proceedings of the Institute of Electronics, Information and Communication Engineers (IEICE) Society Conference, 2015, B-5-110, total of 3 pages.

* cited by examiner

WIRELESS CONTROL APPARATUS

FIELD

The present invention relates to a control apparatus for a wireless base station apparatus to which a beamforming technique is applied.

BACKGROUND

Standardization of a fifth generation mobile communication (hereinafter also referred to as 5G) system, which is a next generation mobile communication system, is being conducted in the 3rd Generation Partnership Project (3GPP). In the 3GPP, standardization of, as the 5G system, a system in which a 5G new radio technology (new radio (NR)) and a current system of long term evolution advanced (LTE-A) are combined, and a system of the NR only that is not combined with the LTE-A, is being conducted. In the 5G system, it is necessary to secure a wide frequency band in order to increase a data communication volume as compared with that in the current system.

It is necessary to use a high frequency band in order to secure the wide frequency band. However, there is a physical constraint that because the attenuation of a radio wave by distance is large in the high frequency band, a propagation distance is shorter in the high frequency band than in a low frequency band even when the same transmission power is employed. In order to overcome this constraint, an increase in reception power and transmission power due to improvement of antenna gain, and use of a beamforming (hereinafter also referred to as BF) technique that intensively performs irradiation with a radio wave (beam) toward a specific direction are considered in the NR of the 5G system. The beamforming is a technique for limiting not only a transmission direction but also a reception direction of a radio wave to a specific direction. Hereinafter, a case of transmitting a beam will be mainly described, but the beamforming can be similarly performed in a case of receiving a beam.

In order for a base station to communicate with a terminal using a beam directed by the BF in a specific direction, it is necessary for the base station to know that the terminal is located within a service area of the base station, and that in which direction the terminal is located. As a technique for the base station to acquire a position where there is a terminal, a method is proposed in which the base station performs irradiation with beams containing different identification numbers in corresponding directions in the service area at regular intervals, and the base station receives from the terminal a report including identification information on beams with favorable reception sensitivity or reception power (Non Patent Literature 1).

In order to cover the whole service area by the method of Non Patent Literature 1, it is necessary for the base station to perform beam irradiation so as to cover the service area evenly and entirely. As a method for realizing the above, there is hybrid beamforming that performs beamforming in which analog beamforming and digital precoding are combined. In the hybrid BF, an array antenna having a plurality of arrays, each of which is an aggregate of antenna elements, is used, and the beam irradiation is performed from the plurality of arrays in different directions such that irradiation with one beam from one array is performed. When the service area of the base station cannot be covered simultaneously by the beam with which irradiation can be performed by the hybrid BF, the base station covers the entire service area by changing the irradiation direction and performing irradiation with the beam.

In Non Patent Literature 1, a base station transmits a reference signal, a synchronization signal, or a cell specific signal (hereinafter collectively referred to as a reference signal) using a beam formed by the hybrid BF. Then, a terminal transmits, to the base station, identification information of the beam included in the reference signal of the beam received by the terminal, and thereby the base station determines a position of the terminal. Hereinafter, the identification information of the beam received by the base station from the terminal is referred to as feedback information. In Patent Literature 1, after performing irradiation with a beam including a reference signal (hereinafter referred to as terminal search beam) and receiving feedback information from a terminal, irradiation with a beam for data communication (hereinafter referred to as communication beam) is performed in a direction selected on the basis of the feedback information, and thereby data communication between the base station and the terminal is performed.

When the terminal moves at high speed, the base station needs to detect the position of the terminal by frequently irradiating the service area of the base station with the terminal search beam in order to follow the movement of the terminal. However, when irradiation with the terminal search beam is frequently performed, there is a problem in that the time for performing irradiation with the communication beam decreases, throughput which is a data communication amount between the base station and the terminal decreases, and cell throughput which is a data communication amount between the base station and all terminals located within the service area of the base station also decreases. As a method for coping with this problem, a technique has been proposed in which the base station increases measurement frequency (transmission frequency of the terminal search beam) in the service area (cell) corresponding to a moving speed of the terminal (Patent Literature 1).

CITATION LIST

Patent Literature

Patent Literature 1: Japanese Translation of PCT International Application Laid-open No. 2012-514377

Non Patent Literature

Non Patent Literature 1: Daichi Uchino, Noriyuki Fukui, Keijiro Take, Atsushi Okamura, "Study on Directional Beam Arrangement in Mobile Communication System", Proceedings of the Institute of Electronics, Information and Communication Engineers (IEICE) Society Conference, 2015, B-5-110

SUMMARY

Technical Problem

In a case where the conventional terminal position detection method described in Patent Literature 1 is applied to the base station that covers the service area with the plurality of beams described above, there is a problem in that, when a terminal of a communication counterpart is moving at high speed, the transmission frequency of the terminal search beam increases in the service area, and thereby throughput of the entire service area decreases.

The present invention has been made in order to solve the above problem, and it is an object of the present invention to provide a wireless control apparatus that controls a wireless base station apparatus and is capable of reducing a decrease in cell throughput of an entire service area when a terminal of a communication counterpart moves at high speed.

Solution to Problem

The present invention according to an aspect of a wireless control apparatus that controls beamforming performed by a wireless base station apparatus that provides a communication service to a service area which includes a plurality of spots to be irradiated with a beam including a terminal search beam and a communication beam that are not used simultaneously for irradiation, and which is irradiated with a plurality of the beams and is not simultaneously covered by the plurality of beams, the apparatus including: an arrival direction estimation unit to estimate an arrival direction of a wireless signal transmitted by a terminal communicating with the wireless base station; and a control unit to determine whether there is an active terminal in the spots on a basis of the arrival direction estimated by the arrival direction estimation unit, and, when it is determined that there is no active terminal, to control beamforming performed by the wireless base station apparatus to decrease a frequency of the terminal search beam with which one or more of the spots determined to include no active terminal is irradiated and to increase a frequency of a communication beam with which another of the spots in the service area is irradiated.

Advantageous Effects of Invention

According to the wireless control apparatus of the present invention, it is determined whether there is an active terminal in a spot, and when there is no active terminal, the frequency of a terminal search beam with which the spot is irradiated is reduced, and thereby it becomes possible to reduce consumption of resources of beamforming of the terminal search beam and to distribute the resources to the beamforming of beams for communication for other spots. Consequently, throughput of the entire cell can be improved.

DESCRIPTION OF EMBODIMENTS

Figure 1:
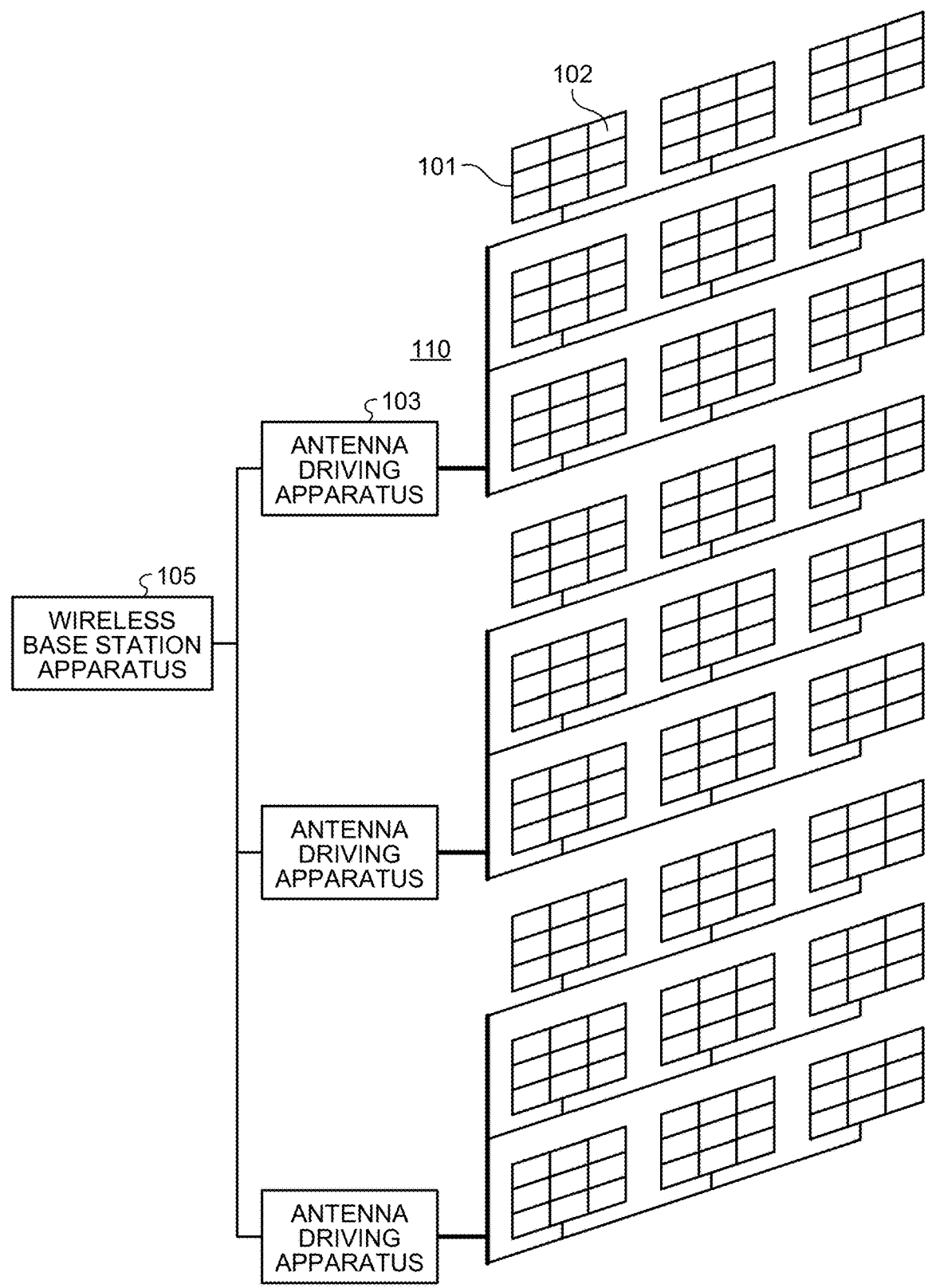
FIG. 1 is a block diagram illustrating an example of a configuration of an array antenna apparatus.

Hereinafter, embodiments of the present invention will be described in detail with reference to the drawings. The present invention is not limited to the embodiments. In the drawings to be referred to hereafter, components which are the same as or corresponding to each other are denoted by the same reference numerals.

First Embodiment

FIG. 1 is a block diagram illustrating an example configuration of an array antenna apparatus 100 which is an antenna connected to a wireless base station apparatus 105 according to a first embodiment of the present invention. An array of a plurality of antenna elements 102 constitutes an antenna array 101, and a plurality of antenna arrays 101 constitutes a sub-array antenna 110. An antenna driving apparatus 103 is an apparatus that drives the sub-array antenna 110. The array antenna apparatus 100 includes pluralities of sub-array antennas 110 and antenna driving apparatuses 103. In FIG. 1, the sub-array antennas 110 and the antenna driving apparatuses 103 are paired, but it is not always necessary to form a pair. The array antenna apparatus 100 of FIG. 1 includes three sub-array antennas 110, but the number thereof may be more than or less than three. Similarly, the numbers of antenna elements 102 and antenna arrays 101 are not limited to the example of FIG. 1. The antenna element 102 is a patch antenna, a dipole antenna, a horn antenna, a monopole antenna, or the like.

The antenna driving apparatus 103 is an apparatus that drives the sub-array antenna 110 and causes the sub-array antenna 110 to perform irradiation with a beam by beamforming. The beamforming method may be any of analog BF, digital BF, and hybrid BF. Here, it is assumed that each antenna array 101 performs irradiation with one beam by BF. Connection between the array antenna apparatus 100 and the antenna driving apparatus 103 is realized by using an optical fiber, a coaxial cable, a waveguide, or a copper wire, or performed wirelessly.

The antenna driving apparatus 103 is connected to the wireless base station apparatus 105. The antenna driving apparatus 103 drives the array antenna apparatus 100 depending on a wireless transmission signal received from the wireless base station apparatus 105. That is, the wireless transmission signal received from the wireless base station apparatus 105 is transmitted from the array antenna apparatus 100 by a determined beam, the determined beam is received by the array antenna apparatus 100, and a wireless reception signal is transmitted to the wireless base station apparatus 105.

Figure 2:
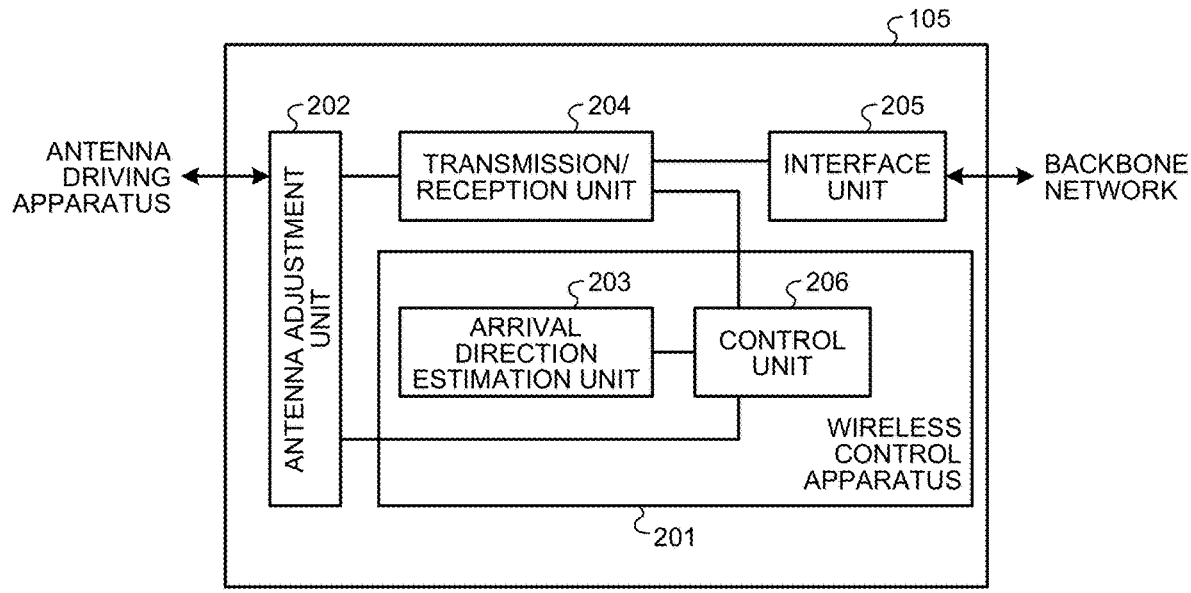
FIG. 2 is a block diagram illustrating an example of a configuration of a wireless control apparatus and a wireless base station apparatus according to a first embodiment of the present invention.

FIG. 2 is a block diagram illustrating an example configuration of the wireless base station apparatus 105 and a wireless control apparatus 201 included in the wireless base station apparatus 105 according to the present embodiment. In addition to the wireless control apparatus 201, the wireless base station apparatus 105 includes an antenna adjustment unit 202, a transmission/reception unit 204, and an interface unit 205. The wireless control apparatus 201 includes an arrival direction estimation unit 203 and a control unit 206.

The antenna adjustment unit 202 is an electronic circuit, which adjusts the amplitude and the phase of a wireless signal transmitted and received from each of the multiple antenna arrays 101 included in the multiple sub-array antennas 110 illustrated in FIG. 1 to perform a beamforming process for generating a beam. The antenna adjustment unit 202 is realized by a digital signal processor (DSP), an application specific integrated circuit (ASIC), a field programmable gate array (FPGA), or the like. The antenna adjustment unit 202 forms a transmit beam (a terminal search beam and a communication beam) in a designated direction in accordance with an instruction from the control unit 206 of the wireless control apparatus 201.

The antenna adjustment unit 202 performs a beamforming process on a transmission signal received from the transmission/reception unit 204 and outputs a wireless transmission signal to be transmitted from the array antenna apparatus 100. In addition, the antenna adjustment unit 202 performs a beamforming process on a received wireless signal received from the array antenna apparatus 100 for forming a reception beam in a direction designated by the control unit 206 and transmits the acquired reception signal to the transmission/reception unit 204. Furthermore, for a process for estimating an arrival direction of a signal transmitted by a terminal, the antenna adjustment unit 202 is controlled by the control unit 206 to perform beamforming such that a certain range, which includes a direction in which there is the terminal that receives the transmission signal of the wireless base station in which the antenna adjustment unit 202 is included, is scanned with a reception beam. In the following description, a range covered by one beam will be referred to as a spot.

The transmission/reception unit 204 is a block that inputs a transmission signal to the antenna adjustment unit 202 and processes a reception signal from the antenna adjustment unit 202. The process performed by the transmission/reception unit 204 is a process of a transmitter/receiver included in an existing wireless communication machine, and examples thereof include a modulation process, a demodulation process, an analog-to-digital conversion process, and a frequency conversion process. The interface unit 205 provides an interface to a backbone network. The interface unit 205 transfers, to the transmission/reception unit 204, a transmission signal addressed to a terminal received from the backbone network (a signal to be transmitted on a communication beam) and transfers, to the backbone network, a signal from a user terminal received from the transmission/reception unit 204 (a signal obtained from a reception signal received using the communication beam).

The wireless control apparatus 201 is an apparatus that controls the beamforming process performed by the antenna adjustment unit 202. Here, a configuration is illustrated in which the wireless base station apparatus 105 includes the wireless control apparatus 201, but the wireless control apparatus 201 may be separated from the wireless base station apparatus and used as a separate apparatus. In the following description, it is assumed that the wireless base station apparatus 105 includes the wireless control apparatus 201. In order to determine a spot in which a terminal is located, the control unit 206 generates a reference signal transmitted by using the terminal search beam, and transfers the reference signal to the transmission/reception unit 204. The transmission/reception unit 204 transfers the received reference signal as a transmission signal to the antenna adjustment unit 202, and the reference signal is transmitted to the terminal by the terminal search beam. At that time, the control unit 206 controls the antenna adjustment unit 202 such that the terminal search beam scans a certain range. Here, the certain range is, for example, a range within which the beamforming can reach (a range where receiver sensitivity is −92 dBm/5 MHz or more).

The terminal transmits, to the wireless base station apparatus 105, a spot identifier (identifier for identifying a position irradiated with a beam) or a beam identifier (identifier for identifying a beam) included in the received terminal search beam, transmission signal information described later, and a reception result of the terminal search beam as feedback information. The reception result is extracted from the reception signal by the transmission/reception unit 204 and transferred to the control unit 206.

The arrival direction estimation unit 203 estimates an arrival direction of a signal transmitted by a terminal that performs beam switching (a terminal that is communicating with the base station in which the arrival direction estimation unit 203 is included) and a terminal that performs handover (a terminal that is communicating with other base station) on the basis of a direction in which the terminal search beam has been transmitted by the control unit 206 by controlling the antenna adjustment unit 202 and a reception result of the terminal search beam received from the terminal. The estimated arrival direction is notified to the control unit 206, and the control unit 206 updates the arrival direction of the signal transmitted by each of terminals to latest information and stores it for each terminal. Even when there is no terminal that performs handover or terminal that performs beam switching in the surroundings, when there is a terminal that is communicating with the base station in which the arrival direction estimation unit 203 is included, the arrival direction estimation unit 203 similarly estimates, for the communicating terminal as well, the arrival direction of the signal transmitted by the terminal. An operation of estimating the arrival direction of the signal transmitted by the terminal is hereinafter referred to as beam tracking.

Figure 3:
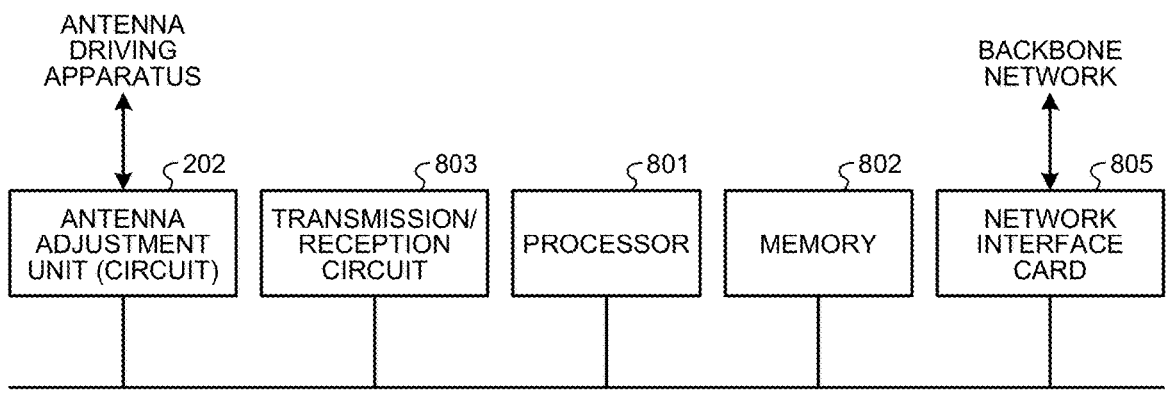
FIG. 3 is a block diagram illustrating an example of a hardware configuration of the wireless base station apparatus according to the first embodiment of the present invention.

Each functional block included in the wireless base station apparatus 105 illustrated in FIG. 2 can be realized by a circuit similar to the antenna adjustment unit 202. On the other hand, as illustrated in FIG. 3, some functions can be realized also by hardware including a processor and its peripheral circuits, and a program that operates on the processor. FIG. 3 illustrates an example configuration in a case where the control unit 206 and the arrival direction estimation unit 203 are realized by comprised of a processor 801, a memory 802, and a network interface card 805, and the transmission/reception unit 204 is realized by a transmission/reception circuit 803. Although an example is illustrated here in which the antenna adjustment unit 202 and the array antenna apparatus 100 are directly connected, the antenna adjustment unit 202 and the array antenna apparatus 100 may be connected via the network interface card 805.

Figure 4:
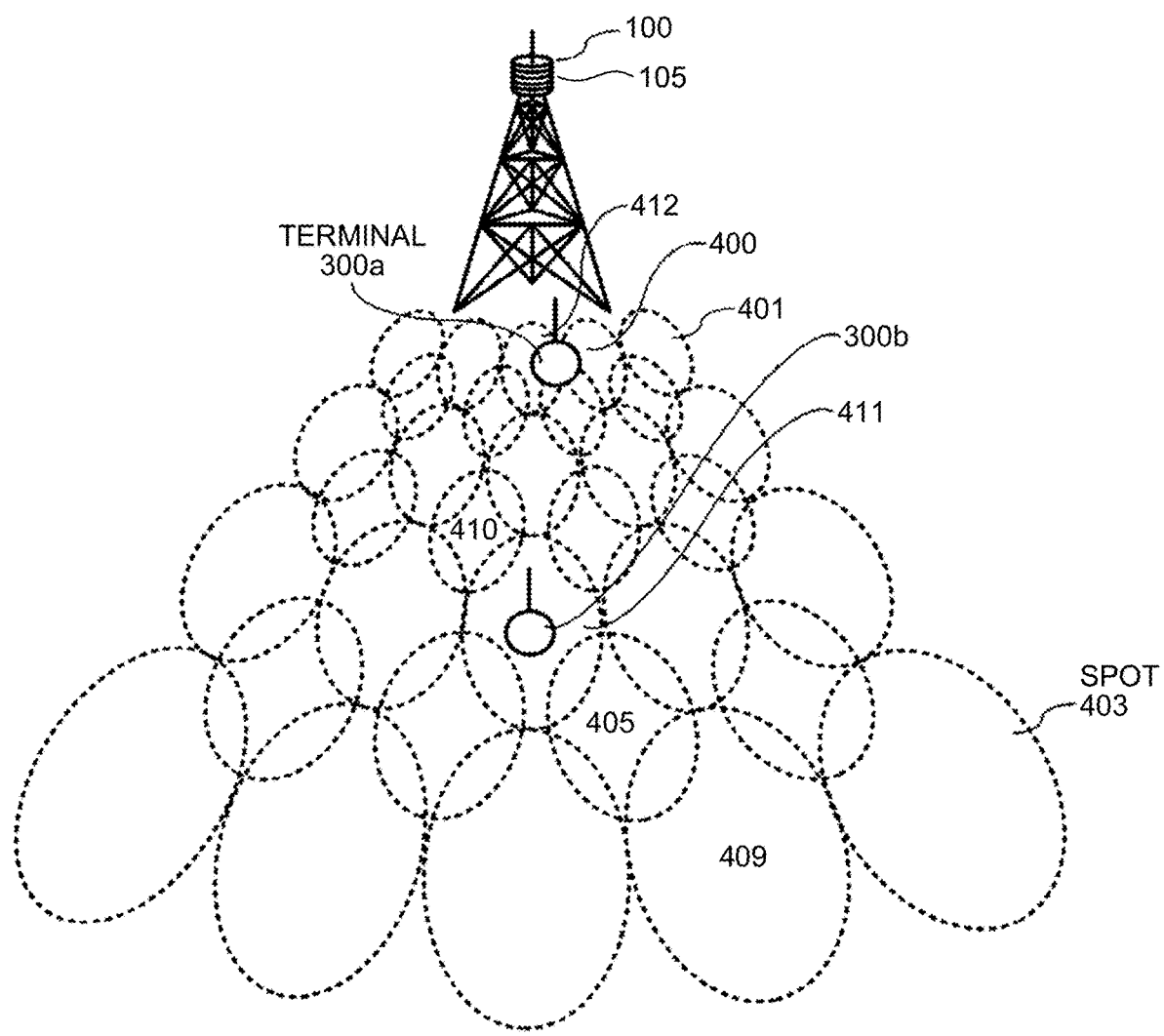
FIG. 4 is a schematic diagram illustrating an example of a configuration of a wireless communication system to which the wireless base station apparatus according to the first embodiment of the present invention is applied.

FIG. 4 is a schematic drawing illustrating an example configuration of a wireless communication system to which the wireless base station apparatus 105 according to the first embodiment of the present invention is applied. In FIG. 4, in order to simplify the drawing, illustration of the wireless base station apparatus 105 is illustrated as a block connected to omitted, and the array antenna apparatus 100, connected to the wireless base station apparatus 105 is illustrated. The wireless communication system illustrated in FIG. 4 includes the wireless base station 105, the array antenna apparatus 100, and terminals 300 (terminals 300a and 300b). In the drawing, dashed ellipses each indicate a spot at which the array antenna apparatus 100 connected to the wireless base station apparatus 105 transmits a beam, and a service area (cell) covered by the wireless base station apparatus 105 is an aggregation of the ellipses. A single spot may be irradiated with a plurality of beams as long as the beams have different frequencies, polarized waves, and the like, and do not interfere with each other.

Here, it is assumed that the number of beams that can be simultaneously transmitted by the wireless base station apparatus 105 is smaller than the number of spots in the service area of the wireless base station apparatus 105, the wireless base station apparatus 105 cannot cover the entire service area simultaneously, and communication services are provided to the spots in the service area on a time-sharing basis. In practice, irradiation with the beam is performed by the array antenna apparatus 100, but hereinafter there is a case where it is described that the irradiation is performed by the wireless base station apparatus 105.

Here, a beam switching operation in the wireless communication system having the configuration illustrated in FIG. 3 will be described. Beam switching is a process performed by a terminal of switching a beam to be used, from one beam to another beam, among beams transmitted from the same base station. The beam switching operation will be described by taking, as an example, a case where the terminal 300a performs switching from a beam with which a spot 400 is irradiated to a beam with which a spot 412 is irradiated in FIG. 4.

In FIG. 4, the terminal 300a performs communication by using a communication beam with which the wireless base station apparatus 105 irradiates the spot 400. In that state, when the control unit 206 of the wireless base station apparatus 105 control apparatus 201 determines that it is necessary to switch the beam used for communication by the terminal 300a to the beam with which the spot 412 is irradiated, the wireless base station apparatus 105 performs estimation of an arrival direction for the terminal by using the terminal search beam to determine the spot in which the terminal 300a is located. At that time, the estimation is performed on the basis of the feedback information and the transmission signal information from the terminal 300a, and transmission signal timing.

Here, the transmission signal information is information necessary for specifying a signal transmitted by the terminal 300a, and examples thereof include an identifier of the terminal (terminal identifier), a bit pattern, and a signal pattern peculiar to the terminal. In the following description, it is assumed that the transmission signal information indicates the above-described terminal identifier, bit pattern and signal pattern peculiar to the terminal, and the like.

The arrival direction estimation unit 203 of the wireless base station apparatus 105 control apparatus 201 acquires signal intensity of the reception signal as a reception result of a signal transmitted from the terminal 300a. Signal to noise power ratio (SNR) or signal to interference plus noise power ratio (SINR) may be acquired instead of the signal intensity. Alternatively, other information may be acquired which indicates a signal reception state, a value of which changing depending on a change in (a relation between a beam formation direction and) a signal arrival direction. In the following description, it is assumed that the signal intensity is acquired.

The arrival direction estimation unit 203 of the wireless base station apparatus 105 control apparatus 201 estimates the arrival direction of the signal transmitted from the terminal 300a on the basis of the signal intensity, it forms a beam in the estimated direction, and it transmits a downlink synchronization signal on the communication beam. In order to receive an uplink signal (hereinafter referred to as an uplink synchronization signal) transmitted from another terminal connected to the wireless base station in which the wireless base station apparatus 105 is included due to handover from another station or the terminal 300a that has performed beam switching, the wireless base station apparatus 105 performs beamforming on the wireless reception signal to acquire the reception signal. The beam width at that time is set to be equal to the beam width at the time of beamforming when transmitting the communication beam.

The arrival direction estimation unit 203 of the wireless base station apparatus 105 control apparatus 201 determines again a spot in which the terminal 300a is located on the basis of the transmission signal information and the feedback information of the terminal 300a obtained from the reception signal.

The signal transmission timing of the terminal 300a is linked with timing of transmitting the terminal search beam from the wireless base station apparatus 105. After transmitting the terminal search beam, the wireless base station apparatus 105 can specify the signal transmission timing from the terminal 300a, and on the basis of the timing, the feedback information from the terminal 300a can be obtained from the reception signal. In order for the wireless base station apparatus 105 and the terminal 300a to perform data transmission on the communication beam, a spot in which the terminal 300a is located is determined in advance by the terminal search beam, and after the determination, the wireless base station apparatus 105 and the terminal 300a perform data transmission (uplink transmission and downlink transmission) by using the communication beam.

Here, the irradiation with the terminal search beam and that with the communication beam are alternately performed by the wireless base station apparatus 105. In a case where all the terminal search beams transmitted from the wireless base station apparatus 105 are at the same interval, when the irradiation frequency of the terminal search beam increases (a transmission interval is shortened), the irradiation frequency of the communication beam decreases (transmission time is shortened), and cell throughput of the wireless base station apparatus 105 decreases. On the contrary, when the irradiation frequency of the terminal search beam decreases, the irradiation frequency of the communication beam increases (the transmission time is extended), and the cell throughput of the wireless base station apparatus 105 increases.

In addition, the irradiation interval of the terminal search beam needs to be determined based on a moving speed of a terminal as a target of communication and the size of the spot. For example, in a case of a spot size of 5 m (assuming that the length of the longest straight line traversing the spot is measured), if the moving speed of the terminal is 10 km/h, the movement of the terminal can be tracked by transmitting the terminal search beam at a frequency of about five times per second to perform beam tracking of the terminal. However, if the moving speed of the terminal is 30 km/h, it is necessary to transmit the terminal search beam at a frequency of about 15 times per second to perform beam tracking.

Even if the moving speed of the terminal is 10 km/h, when the size of the spot is 2 m, for example, it is necessary to transmit the terminal search beam at a frequency of about 15 times per second to perform beam tracking. As schematically illustrated in FIG. 4, a spot away from the wireless base station apparatus has an area larger than a spot that is closer to the wireless base station apparatus. For example, the spot 403 illustrated in FIG. 4 has a larger spot size than the spot 402 and the spot 401, which are located closer to the array antenna apparatus 100 connected to the wireless base station apparatus 105 than the spot 403. Therefore, even if the moving speed of the terminal is the same, when the terminal is located in the spot 403, the transmission frequency of the terminal search beam can be reduced (the transmission interval can be extended). On the other hand, it is necessary to increase the transmission frequency of the terminal search beam (shorten the transmission interval) when a spot in which the terminal is located is the spot 401 near the array antenna apparatus 100.

Furthermore, in a case where the transmission frequency of the terminal search beam is decreased in a spot such as the spot 403 as a cell edge which is a boundary with a cell to which other base station provides service, when there is a terminal that performs handover in which a connection destination is switched between the base stations, the frequency of the terminal search beam receivable by the terminal will decrease, and thus there is a possibility that a handover failure rate will increase and thereby communication disconnection will increase. Therefore, it is not a good idea to reduce the transmission frequency (extend the transmission interval) of the terminal search beam for a spot at the cell edge.

In consideration of tracking a moving terminal as described above, the transmission frequency of the terminal search beam may be less when the spot size is large, and conversely, when the spot size is small, the transmission frequency of the terminal search beam is necessarily high. However, the size of the spot is an upper limit of the number of terminals which can be located therein physically. For example, the spot 401 is located closest to the wireless base station apparatus 105, and has the smallest spot size. If the size of the spot 401 is assumed to be 5 m, the number of terminals that can be located in the spot is about 25.

It is conceivable that, in such a small-size spot, the terminal is not located, or even if the terminal is located, it is in an idle state (a state in which the terminal is dormant or does not perform data communication). Irradiation with the terminal search beam of the spot in such a state with high frequency may be a waste of resources. Here, the resource is a beam transmitted from the array antenna apparatus 100, or a beamforming process for forming the beam. The wireless base station apparatus 105 of the present embodiment can solve this problem by changing the transmission frequency of the terminal search beam to such a spot where there is no terminal located or a spot where only a terminal in an idle state is located.

For example, in FIG. 4, with respect to the spot 400, the spot 401, and the spot 412 which are small-size spots located in the vicinity of the array antenna apparatus 100, in a case where no terminals are located in these spots or terminals located in these spots are in the idle state, the transmission frequency of the terminal search beam with which the spot is irradiated is reduced to extend the transmission interval of the terminal search beam. Furthermore, the beam to be used for transmission of the terminal search beam to the spot (or beam forming process) is allocated as a communication beam to another spot where the terminal in an active state (a state where data communication is performed) is located. Consequently, the cell throughput of the wireless base station apparatus 105 can be improved.

Figure 5:
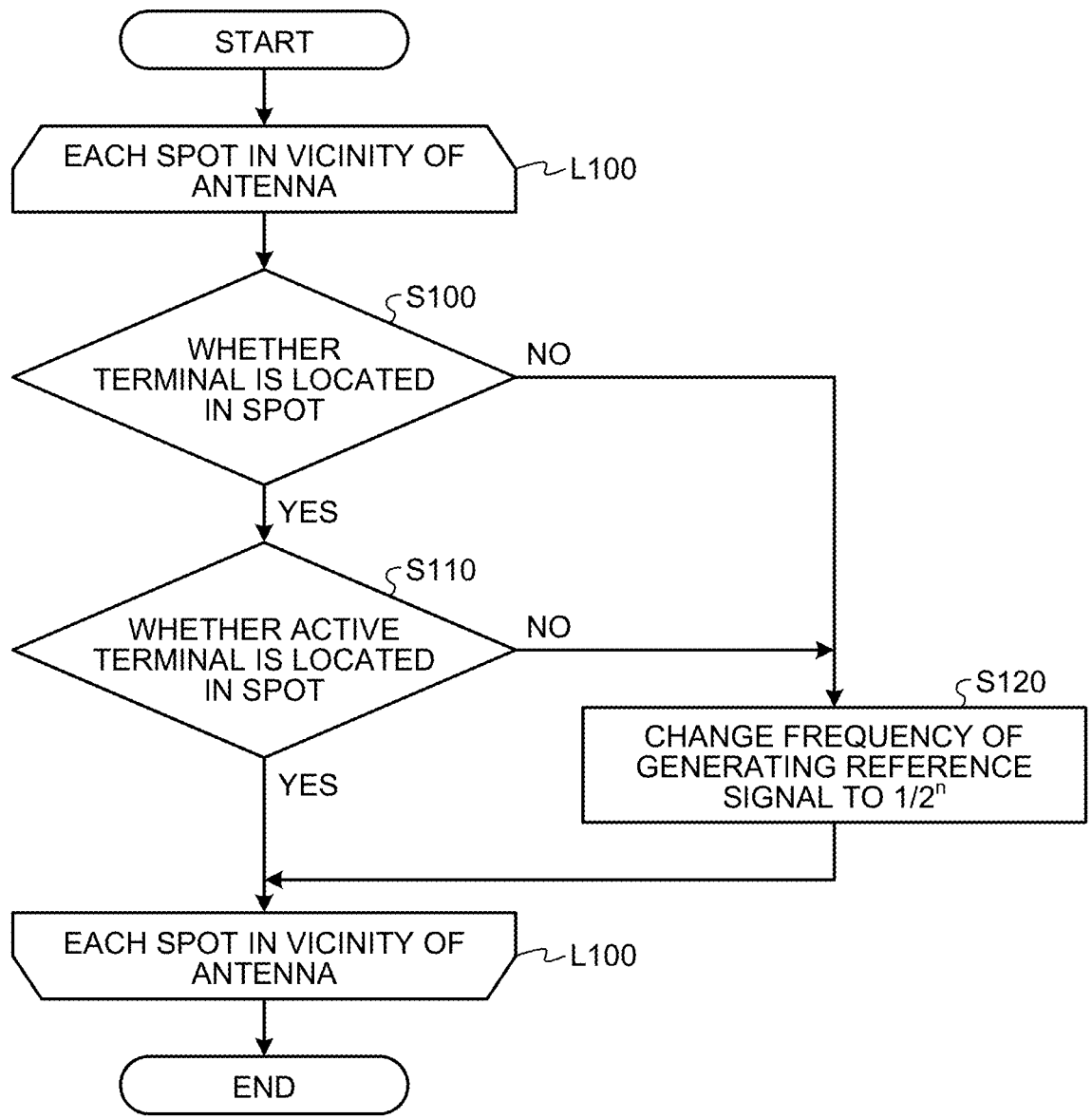
FIG. 5 is a flowchart illustrating an example of a process of the wireless control apparatus according to the first embodiment of the present invention.

Hereinafter, an operation of a process of reducing the transmission frequency of the terminal search beam performed by the control unit 206 of the wireless base station apparatus 105 control apparatus 201 will be described with reference to a flowchart illustrated in FIG. 5. The control unit 206 executes a process in a loop (L100) described in the flowchart of FIG. 5 for all spots, which are in the vicinity of the array antenna apparatus 100 and smaller in size than the other spots in the cell. When the array antenna is installed on a wall surface of a building or the like, because a tilt angle of BF is large with respect to a vertical direction, a small-size spot is formed in the vicinity of the array antenna apparatus 100 of the wireless base station apparatus 105. In this way, it is possible to specify the spots to be processed in L100 in advance.

A process in L100 will be described. First, regarding a target spot, the control unit 206 determines whether the terminal is located in the spot (S100). The terminal to be processed in S100 is a terminal that the arrival direction estimation unit 203 estimates the arrival direction of the transmission signal of the terminal by beam tracking at the time of starting the process of L100 and knows the presence thereof. When such a terminal is present in a specific spot, the terminal is located in the spot. When it is determined in the process of S100 that the terminal is not located, the control unit 206 executes a process of S120 described later.

When it is determined in the process of S100 that the terminal is located, the control unit 206 next determines whether an active terminal is located in the spot (S110). When it is determined in the process of S110 that there is no active terminal located, the control unit 206 performs the process of S120 described later. When it is determined in the process of S110 that there is an active terminal located, the process of L100 is completed without changing the frequency of generating a reference signal. When there remains a spot as a target of the process of L100, the process of L100 is continuously performed for the remaining spot, and when there remains no such spot, the process of the flowchart of FIG. 5 is completed.

Here, the process of S120 will be described. In the process of S120, regarding the target spot, the control unit 206 changes the transmission frequency of the reference signal to be sent on the terminal search beam to $1/(2$ to the n-th power). That is, the interval for transmitting the reference signal is increased by (2 to the n-th power)-fold. Here, n is a positive integer and is a parameter determined by the size of the spot and the distance between the terminal and the antenna. As a method for determining n, there is a method for determining n on the basis of, for example, the law of inverse square.

For example, when it is assumed that the terminal passes through at the maximum moving speed a spot created by a beam expanded in accordance with the law of inverse square from an installation position of the antenna, n can be calculated on the basis of the following formula (1), by which a spot where the terminal is located can be known, while following the movement of the terminal and performing beam switching.

$$2\textasciicircum n = (((H \times \tan\theta)/m)/V) \times 1000 \qquad (1)$$

In the formula (1), V is a maximum moving speed (m/s) of the terminal, θ is an angle formed by a location of the base station, a location of the terminal when the base station determines beam switching, and a location of the terminal when the beam switching is performed. θ is an angle (rad) at which the determination of the beam switching is started. A section from the location where the beam switching is determined to the location where the beam switching is performed, can be obtained from overlapping of the spots when determining spot positions in the service area. H is antenna installation height (m), and m is the number of measurement protection stages (number of times), which indicates the number of measurements performed in the range of the angle θ. The larger m is, the more ping-pong beam switching (a phenomenon in which after moving to another spot, a beam is immediately switched to a previous spot, which often occurs when the reception sensitivity is antagonistic among the spots) can be suppressed.

The determined value of n can be notified to a terminal located in the corresponding spot by downlink individual transmission or broadcast transmission. Thus, the terminal can receive the reference signal transmitted at an interval of 2 to the n-th power, i.e. the normal interval, and can transmit the feedback information to the base station. The determined value of n can also be transmitted and notified together with spot location information (a base station identifier, a spot identifier, a geographical location or a radio wave location) to a terminal that may newly be located in the target spot by beam switching or handover. Here, regarding another wireless base station apparatus, it is conceivable that notification is performed by using an interface between the base stations such as an X2 interface defined by the 3GPP standard, or that notification is performed via a control apparatus that manages the wireless base station apparatuses.

By reducing the transmission frequency of the reference signal to 1/(2 to the n-th power), it is possible to reduce the trans-resources used in the beam forming for the terminal search beam. Thus, it is possible to use the resources corresponding to the reduction for the communication beam for another spot, and the throughput (cell throughput) in the entire service area of the wireless base station apparatus 105 can be improved. In addition, the process of reducing the transmission frequency of the reference signal to 1/(2 to the n-th power) can be easily realized by bit shift. Particularly, in a case of realization with hardware (FPGA, ASIC, and DSP), there is an effect of reducing the circuit scale to suppress manufacturing cost.

The transmission frequency of the reference signal to be sent on the terminal search beam may be decreased by 1/(an integer multiple of n). How many times n is multiplied at that time can be determined by the number of spots present between the service area end and the corresponding spot, for example. Although it is disadvantageous in that the transmission frequency of the reference signal cannot be abruptly reduced as compared with a case where it is set to 1/(2 to the n-th power), the following effects are obtained in small cells with a small service area, and in small spots where a directional beam is further converged. When an antenna is installed on a wall surface of a building and irradiation with a beam is performed in a lateral direction, a beam irradiation range (spot) is shaped to be an ellipse elongate in an antenna direction, but when the antenna is installed on an indoor ceiling and irradiation with the beam is performed downward, the spot is more circularly shaped. When the spot is more circularly shaped, the size difference of the spots is small between spots near the antenna and spots away from the antenna, and accordingly, if the transmission frequency of the reference signal is set to 1/(2 to the n-th power), there is a possibility that the transmission frequency is excessively reduced. In such a case, by setting the transmission frequency of the reference signal to be 1/(an integer multiple of n), it is possible to prevent the transmission frequency of the reference signal from being excessively reduced.

In the above description, the spot in the vicinity of the wireless base station apparatus 105 (the antenna apparatus 100) is set as the target of reducing the transmission frequency of the terminal search beam, but without being bounded thereto, a spot other than the spot in the vicinity thereof may be set as the target. When a spot adjacent to another spot where a terminal in the active state is located becomes a target of reducing the transmission frequency of the terminal search beam, the transmission frequency may not be reduced in preparation for a case where the terminal in the active state performs beam switching. The transmission frequency of the terminal search beam may not be reduced only when the terminal in the active state located in the adjacent spot is moving.

Furthermore, regarding the spot at the cell edge, it may be determined whether to reduce the transmission frequency of the terminal search beam depending on a situation of a terminal in a spot belonging to a cell of another base station adjacent thereto. If there is a terminal in the active state in the spot of another base station adjacent thereto, it is conceivable that the transmission frequency of the terminal search beam is not reduced. The state of the spot of another base station adjacent thereto can be acquired by directly communicating using the interface between the wireless base station apparatuses as described above, or acquired via the control apparatus of the wireless base station apparatus.

Second Embodiment

Figure 6:
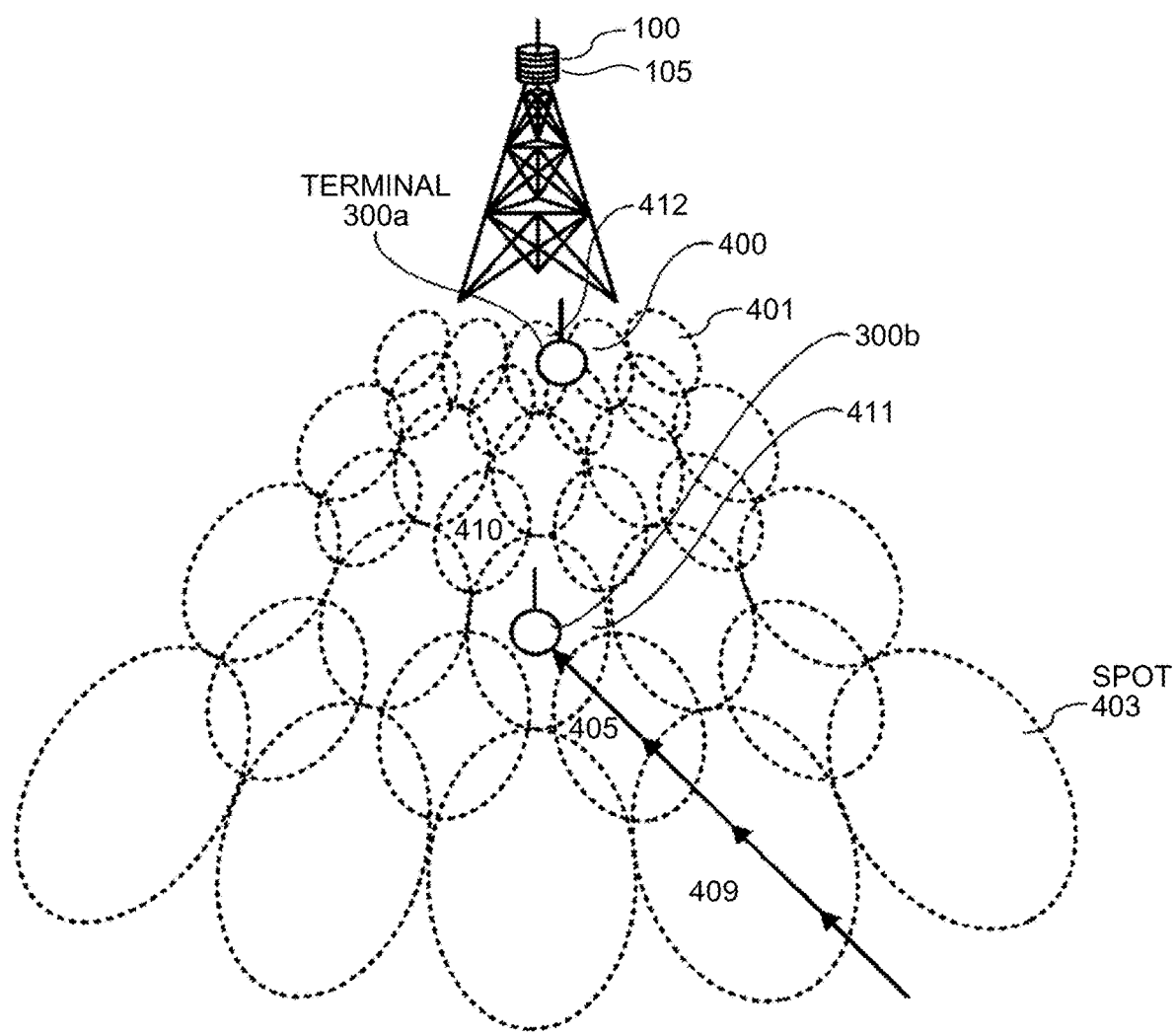
FIG. 6 is a schematic diagram illustrating an operation example in a wireless communication system according to a second embodiment of the present invention.

Next, an example will be described in which the transmission frequency of a terminal search beam of a spot is changed on the basis of a moving speed of a terminal located in the spot. A configuration of the wireless base station apparatus 105 of the present embodiment is the same as that of the first embodiment. For example, it is assumed that the terminal 300b moving as illustrated in FIG. 6 is connected to the wireless base station apparatus 105 at a spot 409 by handover from another base station. Then the terminal 300b performs beam switching from the spot 409 to a spot 405 and from the spot 405 to a spot 411, and now it communicates with the wireless base station apparatus 105 at the spot 411. The wireless base station apparatus 105 tracks the movement of the terminal 300b by performing beam tracking under the control of the wireless control apparatus 201.

At that time, if the terminal 300b is a terminal with the highest moving speed among the active terminals located in the spot 411, the wireless base station apparatus 105 adjusts the transmission frequency of the terminal search beam to the spot 411 to a value with which the terminal 300b can be tracked by beam tracking. Thus, it is possible to suppress excessive transmission of terminal search beams and to allocate BF resources to transmission of communication beams in other spots. Thus, the cell throughput of the base station can be improved. In other words, it is possible to achieve both of following of the movement of the terminal and improvement of the cell throughput.

Figure 7:
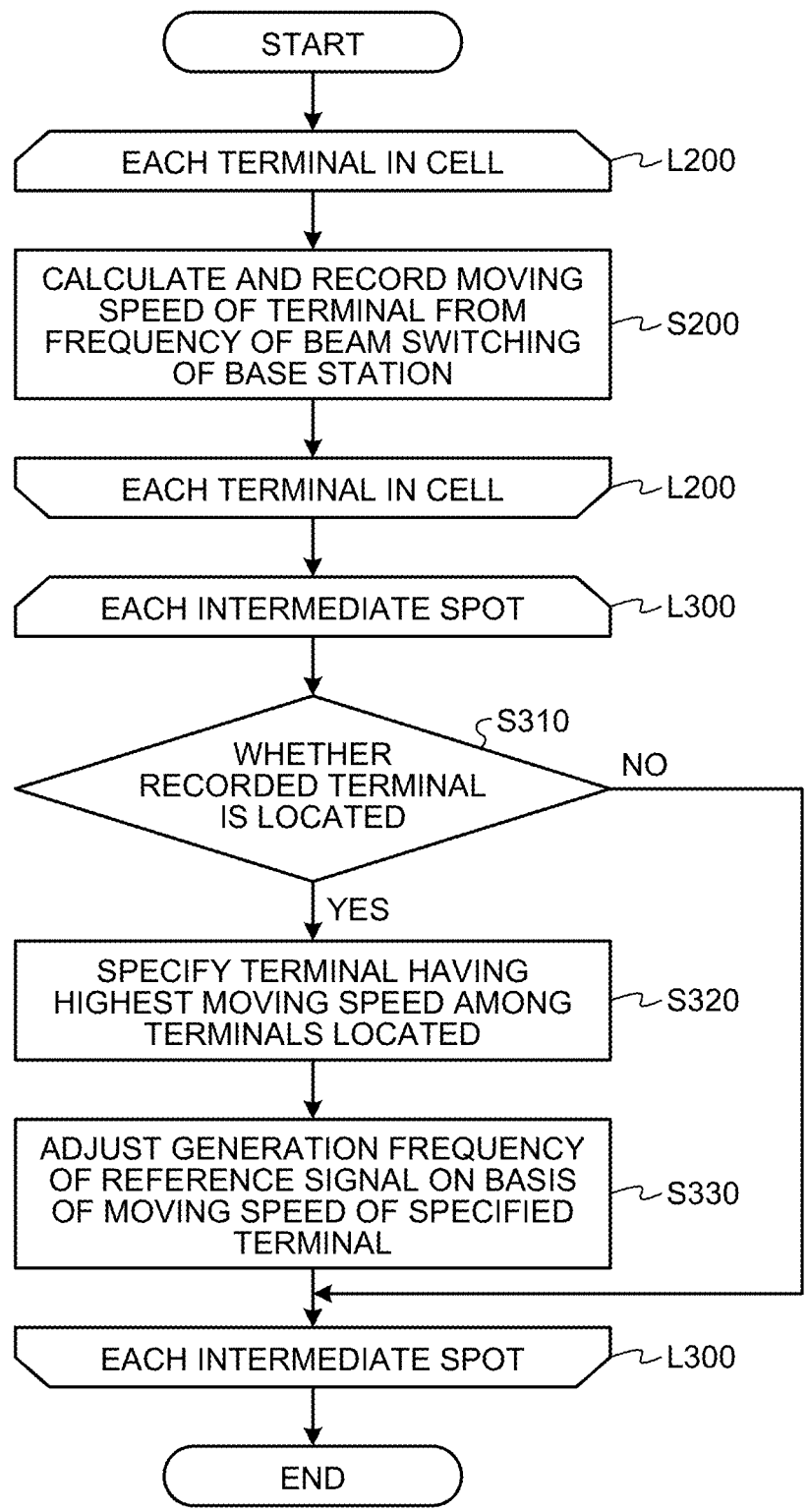
FIG. 7 is a flowchart illustrating an example of a process of the wireless control apparatus according to the second embodiment of the present invention.

FIG. 7 is a flowchart illustrating an example of a process for reducing the transmission frequency of the terminal search beam performed by the control unit 206 of the wireless control apparatus 201 in the present embodiment. The flowchart of FIG. 7 includes a loop process L200 and a loop process L300. First, by the process of L200, the control unit 206 uses terminals in a cell as a target and calculates a moving speed for each of the terminals. In L200, on the basis of the frequency of beam switching of each target terminal in the cell, the moving speed of the terminal is calculated and obtained, and the moving speed is recorded for each terminal (S200).

Hereinafter, a specific example of the process of S200 will be described by taking the above-described terminal 300b as an example. As described above, the terminal 300b is connected to the wireless base station apparatus 105 at the spot 409, and thereafter it performs the beam switching to the spot 411 via the spot 405. The moving speed of the terminal 300b in that case is calculated from the time when the beam switching from the spot 409 to the spot 405 was performed, the time when the beam switching from the spot 405 to the spot 411 was performed, and the size of each spot previously known. Here, the size of the spot is defined as a distance between a position where the terminal 300b performs beam switching and a position where the terminal 300b performs next beam switching, and is determined at the time of designing the cell. If there is an overlapping portion between adjacent spots, the size of the spots may be determined in consideration of overlap.

Specifically, assuming that the size of the spot 409 is 50 m and time from when the terminal 300b is connected to the wireless base station apparatus 105 at the spot 409 until when the beam switching is performed to the spot 405 is 18 seconds, a speed of 10 km/h can be obtained from the following formula (2). In addition, assuming that the size of the spot 405 is 15 m, and the time from when the beam switching is performed to the spot 405 until when the beam switching is performed to the spot 411 is 5.4 seconds, a speed of 10 km/h can be similarly obtained.

$$\text{Distance/Time=Speed} \tag{2}$$

Then, the control unit 206 records the obtained moving speed for each terminal. It is also possible to calculate the moving speed of the terminal from the size of the service area of the base station and the frequency of handover by performing similar calculation.

Next, the control unit 206 performs a process in L300 on each of the spots (referred to as intermediate spots) that are not cell edges in the cell. In the process of L300, first, the control unit 206 determines whether a terminal whose moving speed has been recorded in the process of L200 is located in the intermediate spot to be processed (S310). When it is determined in the process of S310 that the terminal is not located therein, the process breaks out of the loop and the process for the intermediate spot is ended, and the process for the next intermediate spot is executed. In a case where the process has been completed for all the intermediate spots to be processed, the process of L300 is ended.

Figure 8:
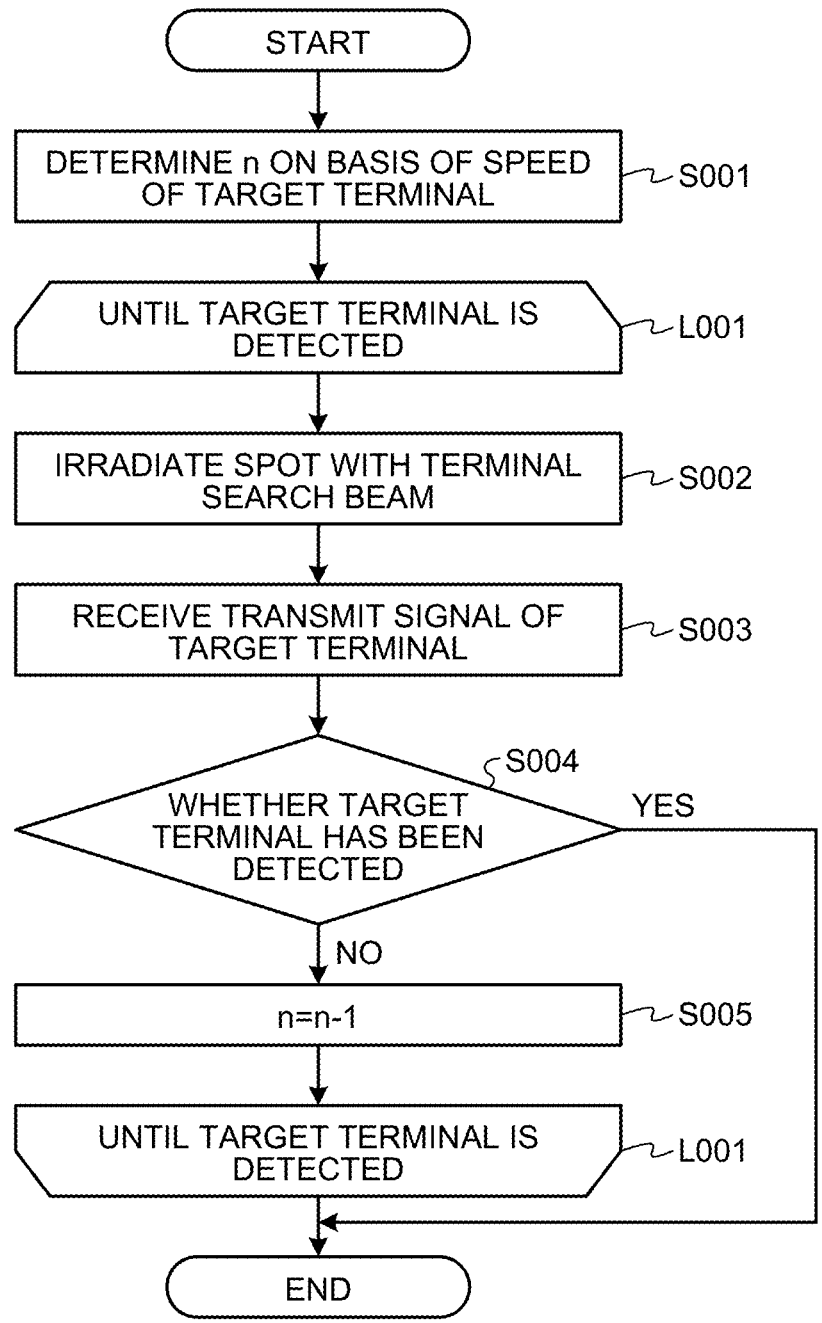
FIG. 8 is a flowchart illustrating an example of a process of adjusting a transmission frequency of a terminal search beam performed by the wireless control apparatus according to the second embodiment of the present invention.

When the terminal is located in the process of S310, the control unit 206 specifies a terminal having the highest moving speed among the terminals located in the intermediate spot to be processed (S320). Next, the control unit 206 adjusts the transmission frequency of the reference signal so that the movement of the terminal specified in S320 can be tracked with the frequency (S330). Specifically, an adjustment procedure illustrated in a flowchart of FIG. 8 is conceivable.

First, the control unit 206 determines the value of n in accordance with the above-described formula (1) on the basis of the moving speed of the target terminal (S001). Then, the control unit 206 executes a loop process of L001 until the target terminal is detected. In the process of L001, the control unit 206 first generates a reference signal at an interval determined on the basis of n determined in S001 (S002). Thus, the target spot is irradiated with the terminal search beam. Next, the control unit 206 receives a response signal to a terminal search signal transmitted by the target terminal, that is, a signal including the above-described feedback signal and transmission signal information (S003). Next, the control unit 206 determines whether the target terminal has been detected by the process of S003 (S004). When the target terminal has not been detected in the process of S004, 1 is subtracted from the value of n and update is performed (S005). Then, the process of L001 is repeated until the target terminal is detected. When the target terminal has been detected in the process of S004, the control unit 206 breaks out of the process of L001 and ends the adjustment of the transmission frequency of the terminal search beam.

In the process of L300, a threshold may be set for the moving speed of the terminals, and a terminal moving at a speed equal to or higher than the threshold may be excluded from the target of the process of S320. This will place an upper limit on the moving speed of the terminals to which the wireless base station apparatus 105 provides the service. In addition, when a threshold value for the moving speed of the terminals is set in the wireless base station apparatus 105, different threshold values may be set depending on the installation location of the wireless base station apparatus 105.

With regard to the terminal that has been excluded from the target in the process of S320, it becomes impossible to detect the terminal by beam tracking following the movement of the terminal, and communication service cannot be provided. For such a terminal, it is conceivable that the terminal is connected to a macro base station, which covers a wider range as a service area, of another communication method (for example, when the wireless base station apparatus 105 is a 5G base station of 3GPP standard, the fourth generation mobile communication method of LTE or LTE-A). Thus, it is possible to limit terminals to which the wireless base station apparatus according to the present embodiment provides the service to a terminal that moves at low speed, and as a result, it is possible to reduce the transmission frequency of the terminal search beam. It can be said that this enables load distribution among the base stations of the cellular system.

INDUSTRIAL APPLICABILITY

According to the wireless control apparatus of the present invention, a wireless base station, which provides communication services by employing a plurality of spots irradiated with at least one beam as a service area, dividing an area within the service area into a plurality of portions, and radiating beams on a time-sharing basis, can control to shorten the transmission time of the terminal search beam for the spot in the service area and increase in the transmission time of the communication beam of another spot in the service area, and therefore, the wireless control apparatus is useful in a mobile wireless communication system.

REFERENCE SIGNS LIST 100 array antenna apparatus; 101 antenna array; 102 antenna element; 103 antenna driving apparatus; 105 wireless base station apparatus; 110 sub-array antenna; 201 wireless control apparatus; 202 antenna adjustment unit; 203 arrival direction estimation unit; 204 transmission/reception unit; 205 interface unit; 206 control unit; 801 processor; 802 memory; 803 transmission/reception circuit; 805 network interface card; 300, 300a, 300b terminal.

The invention claimed is:

1. A wireless control apparatus that controls beamforming performed by a wireless base station apparatus that provides a communication service to a service area which includes a plurality of spots to be irradiated with a beam including a terminal search beam and a communication beam that are not used simultaneously for irradiation, the service area being irradiated with a plurality of the beams and is not simultaneously covered by the plurality of beams, the wireless control apparatus comprising:
- a processor; and
- a memory configured to store a program, that when executed by the processor, causes the processor to:
  - estimate an arrival direction of a wireless signal transmitted by a terminal communicating with the wireless base station apparatus; and
  - determine whether there is an active terminal in the spots on a basis of the estimated arrival direction, and, when it is determined that there is no active terminal, control the beamforming performed by the wireless base station apparatus to decrease a frequency of the terminal search beam that irradiates one or more of the spots that are determined to include no active terminal, and increase a frequency of the communication beam with which another of the spots in the service area is irradiated.

2. The wireless control apparatus according to claim 1, wherein the processor further performs control to reduce the frequency of the terminal search beam with respect to some of the spots smaller than another of the spots in the service area.

3. The wireless control apparatus according to claim 2, wherein the executed program cause the processor to operate so that the one or more of the spots, which are irradiated by the terminal search beam whose frequency is reduced by the processor, does not include any spot that is adjacent to another of the spots where there is an active terminal.

4. The wireless control apparatus according to claim 1, wherein the processor further reduces the frequency of the terminal search beam to $½^n$, n is a positive integer.

5. The wireless control apparatus according to claim 1, wherein the processor further measures a moving speed of the terminal located in the service area, and adjusts a transmission frequency of the terminal search beam depending on the moving speed of the terminal with a highest moving speed among active terminals located in each of the spots located in a portion other than a boundary of the service area.

6. The wireless control apparatus according to claim 5, wherein a threshold for the moving speed of the terminal is set, and the processor further adjusts the transmission frequency of the terminal search beam depending on the moving speed of the terminal with the highest moving speed among terminals of which the measured moving speed does not exceed the threshold.

* * * * *